Oct. 21, 1969            K. C. MERRELL         3,474,352
D.C. TO A.C. CONVERTER FOR USE WITH BATTERY
DRIVEN CLOCKS AND THE LIKE
Filed Nov. 22, 1967

INVENTOR
KENNETH C. MERRELL

BY *Sughrue, Rothwell, Mion, Zinn & Macpeak*

ATTORNEYS

United States Patent Office 3,474,352
Patented Oct. 21, 1969

3,474,352
D.C. TO A.C. CONVERTER FOR USE WITH BATTERY DRIVEN CLOCKS AND THE LIKE
Kenneth C. Merrell, Brea, Calif., assignor to Robertshaw Controls Company, Richmond, Va., a corporation of Delaware
Filed Nov. 22, 1967, Ser. No. 685,088
Int. Cl. H03k 3/26
U.S. Cl. 331—111   6 Claims

ABSTRACT OF THE DISCLOSURE

A transistorized D.C. to pulse converter in which the pulse period is substantially independent of supply voltage and transistor parameters.

---

D.C. to pulse converters are useful in driving alternating current synchronous timing or clock motors from a battery or a D.C. source. In the present invention the converter is substantially insensitive to variations in ambient temperature and in supply voltage.

The invention comprises an RC charging circuit and a voltage divider connected in parallel across a source of D.C. voltage. A transistorized switching arrangement provides a minimum and maximum threshold to the voltage built up across the capacitor whereby the transistors discharge the capacitor when the voltage thereacross reaches some preset maximum value. The discharge path is then closed when the voltage across the capacitor reaches some preset minimum value. The capacitor charges substantially between zero and the value determined by the voltage divider.

Figure 1:
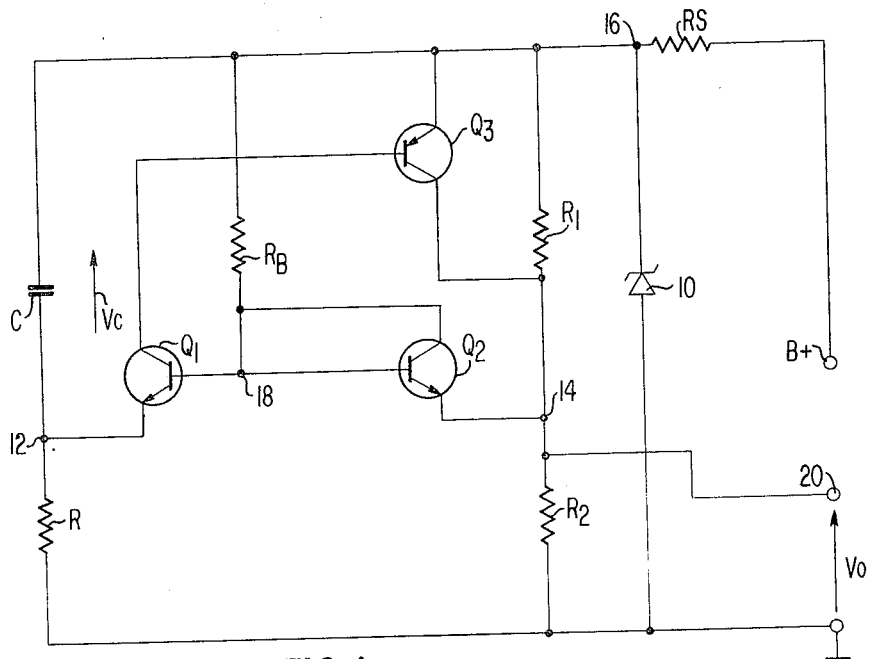
Figure 2A:
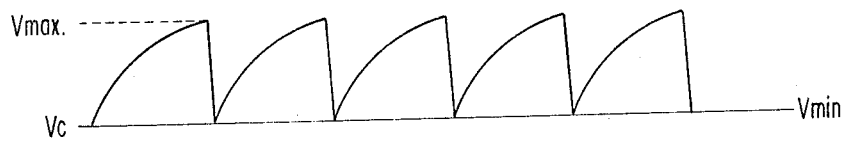
Figure 2B:

The invention will be better understood by referring to the following detailed description and the accompanying drawings wherein, FIGURE 1 is a schematic diagram of a preferred embodiment of the invention; and FIGURES 2A and 2B are waveforms illustrating voltages occurring at different points within the schematic of FIGURE 1.

The circuitry shown in FIGURE 1 operates to convert a D.C. voltage into a train of positive pulses at the output terminal 20. The pulse repetition rate is substantially independent of variation in the supply source and in transistor parameters. A Zener diode 10 and series resistor RS connected across the supply source B+ provides a voltage $V_z$ to the converter circuitry.

The circuit initial conditions are as follows:

$V_c = 0$ $V_0 = V_z \left( \dfrac{R_2}{R_1 + R_2} \right)$ $Q_1$ and $Q_3$ are non-conducting
$Q_2$ is conducting.

The transistor $Q_1$ is off because the base-emitter junction is reverse biased, and $Q_2$ is on because $V_0$ is lower than the base potential of $Q_2$.

As C begins charging through resistor R, the emitter potential of $Q_1$ begins to drop until it drops low enough to turn on $Q_1$. When $Q_1$ turns on, it pulls $Q_3$ into saturation thereby short circuiting $R_1$ and raising the potential at the output. The capacitor C discharges quickly through $Q_3$ and $Q_1$ down to a value sufficient to turn off $Q_1$ thereby turning off $Q_3$ and beginning the cycle again.

The voltage across capacitor C is illustrated by the waveform of FIGURE 2A and the output voltage $V_0$ is illustrated by the waveform of FIGURE 2B. The maximum voltage attained across capacitor C is that which occurs just as $Q_1$ turns on and can be written as $$V_c \text{ (max.)} = V_{be}Q_1 - V_{be}Q_2 + V_z \left( \dfrac{R_1^i}{R_1 + R_2} \right)$$

The minimum voltage attained across the capacitor during the rapid discharge is that which occurs just as $Q_1$ turns off and can be written as $$V_c \text{ (min.)} = V_{be}Q_1 - V_{be}Q_2 + V_{ce} \text{ (sat.) } Q_3$$

Since the discharge time is substantially instantaneous the total period is substantially equal to the time it takes to change capacitor C from a minimum value of V min. to a maximum value of V max. The period T may be expressed as $$T = \left[ \ln \dfrac{V_z - V_c \text{ (min.)}}{V_z - V_c \text{ (max.)}} \right] RC$$

Substituting for $V_c$ (min.) and $V_c$ (max), we have, $$T = \left[ \ln \dfrac{V_z - (V_{ce} \text{ (sat.) } Q_3 + V_{be}Q_1 - V_{be}Q_2)}{V_z - \left( \dfrac{R_1}{R_1 + R_2} \right)(V_z) + V_{be}Q_1 - V_{be}Q_2)} \right] RC$$

As the saturation voltage of $Q_3$ approaches zero and when $V_{be}Q_1 = V_{be}Q_2$, the equation for T becomes, $$T = \left( \ln \dfrac{R_1 + R_2}{R_2} \right) RC$$

Thus, the period of the output pulse train is reasonably independent of the supply voltage or transistor parameters. The Zener diode and series resistor $R_s$ further improves the frequency independence with supply voltage and allows operation over supply variations of 50%.

While the invention has been particularly shown and described with reference to a preferred embodiment thereof, it will be understood by those skilled in the art that various changes in form and details may be made therein without departing from the spirit and scope of the invention.

What is claimed is:
1. A D.C. to pulse converter comprising:
 (a) a source of D.C. potential,
 (b) a capacitor and resistor connected in series across said source,
 (c) a voltage divider network comprising first and second impedance means connected across said source,
 (d) first and second transistors having their bases connected together and their emitters connected respectively to the junction of said resistor and capacitor and the junction of said first and second impedance means,
 (e) means for biasing said first transistor non-conducting until the voltage on said capacitor reaches a maximum value proportional to said supply voltage,
 (f) switch means responsive to said first transistor conducting for providing a discharge path for said capacitor and for causing said first transistor to turn off when the voltage across said capacitor is reduced to a minimum value independent of said supply voltage.
2. A D.C. to pulse converter as claimed in claim 1 wherein said switch means comprises a third transistor, said third transistor having its emitter collector path connected across said first impedance means and its base connected to the collector of said first transistor.
3. A D.C. to pulse converter as claimed in claim 2 wherein said second transistor has its collector connected to its base.
4. A D.C. to pulse converter as claimed in claim 3 wherein said first and second transistors are NPN type transistors.

5. A D.C. to pulse converter as claimed in claim 4 wherein said third transistor is a PNP type transistor.

6. A D.C. to pulse converter as claimed in claim 5 wherein said source of D.C. potential comprises an unregulated D.C. voltage source, a series resistor, and a Zener diode connected across the series combination of said unregulated voltage source and said series resistor.

References Cited

Wireless World, p. 397, August 1965.

JOHN KOMINSKI, Primary Examiner

U.S. Cl. X.R.

307—288; 331—108